US012037226B2

(12) United States Patent
Helmuth

(10) Patent No.: US 12,037,226 B2
(45) **Date of Patent: *Jul. 16, 2024**

(54) HOISTING SYSTEM, APPARATUS, KIT AND METHODOLOGY

(71) Applicant: Mark Helmuth, Rockingham, VA (US)

(72) Inventor: Mark Helmuth, Rockingham, VA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/459,429

(22) Filed: Aug. 27, 2021

(65) Prior Publication Data

US 2021/0395053 A1 Dec. 23, 2021

Related U.S. Application Data

(63) Continuation of application No. 16/369,018, filed on Mar. 29, 2019, now Pat. No. 11,104,555, which is a continuation of application No. 15/356,820, filed on Nov. 21, 2016, now Pat. No. 10,252,893.

(60) Provisional application No. 62/258,590, filed on Nov. 23, 2015.

(51) Int. Cl.
*B66C 23/20* (2006.01)
*B66C 23/68* (2006.01)
*E04G 21/16* (2006.01)

(52) U.S. Cl.
CPC ............ *B66C 23/202* (2013.01); *B66C 23/68* (2013.01); *E04G 21/168* (2013.01)

(58) Field of Classification Search
CPC ....... B66C 23/20; B66C 23/202; B66C 23/68; E04G 21/168
USPC .......................................................... 254/385
See application file for complete search history.

(56) References Cited

U.S. PATENT DOCUMENTS 1,650,656 A * 11/1927 Sasgen .................. B66C 23/202 212/175
1,798,456 A * 3/1931 Carroll .................... B66C 23/20 427/286
2,147,313 A * 2/1939 Payson ................. B66C 23/305 212/200
2,812,077 A * 11/1957 Proctor ................. E04G 21/167 414/11
2,836,054 A * 5/1958 Brauer .................. E04G 21/168 52/125.4
3,382,988 A * 5/1968 O'Reilly ............. E04F 21/1822 254/387
3,485,386 A * 12/1969 Miller ..................... B66C 23/20 414/11
3,727,885 A * 4/1973 Jones .................... E04G 21/168 254/133 R (Continued)

*Primary Examiner* — Michael R Mansen
*Assistant Examiner* — Henrix Soto
(74) *Attorney, Agent, or Firm* — Raymond Van Dyke; Van Dyke Intellectual Property Law

(57) ABSTRACT

System, apparatus, device, kit, method and associated technique for safely and securely lifting wall and other structures to a vertical position. An electronic winch device that when connected to an end of a wall structure lifts the structure. A keeper or catchment such that when the electronic winch has hoisted the wall structure to a substantially vertical position, catches and keeps the wall structure in place, allowing the technician to more properly secure the wall structure. The apparatuses are also designed for portability and collapsibility, with structural members telescoping inside one another to minimize size in transport but securely configurable when extended and locked into place.

25 Claims, 8 Drawing Sheets

(56) References Cited

U.S. PATENT DOCUMENTS

| | | | | |
|---|---|---|---|---|
| 5,833,430 | A * | 11/1998 | Reynolds | B66C 23/202<br>52/DIG. 1 |
| 6,000,898 | A * | 12/1999 | Sharp | E04G 21/168<br>414/800 |
| 6,089,809 | A * | 7/2000 | Dellinger | E04G 21/168<br>254/338 |
| 10,252,893 | B2 * | 4/2019 | Helmuth | B66C 23/202 |
| 11,104,555 | B2 * | 8/2021 | Helmuth | B66C 23/68 |
| 2003/0039531 | A1 * | 2/2003 | Bickle | E04G 21/16<br>254/338 |
| 2005/0230340 | A1 * | 10/2005 | Barger, Sr. | B66C 23/44<br>212/280 |
| 2013/0343833 | A1 * | 12/2013 | Mullins | B66C 23/202<br>414/11 |

* cited by examiner

HOISTING SYSTEM, APPARATUS, KIT AND METHODOLOGY

CROSS REFERENCE TO RELATED APPLICATION

The present invention is a continuation of U.S. patent application Ser. No. 16/369,018, filed Mar. 29, 2019, now U.S. Pat. No. 11,104,555, which is a continuation of U.S. patent application Ser. No. 15/356,820, filed Nov. 21, 2016, now U.S. Pat. No. 10,252,893, which claims benefit of priority from U.S. Patent Application Ser. No. 62/258,590, all of which are entitled "HOISTING SYSTEM, APPARATUS AND METHODOLOGY," filed Nov. 23, 2015, the subject matters of which are incorporated by reference herein.

FIELD OF THE INVENTION

The present invention is directed to improvements in tools and techniques for the assembly of homes, offices and other structures that have walls, and more generally directed to the safe and secure lifting of large components, such as panels and walls, for building or structure assembly.

BACKGROUND OF INVENTION

The building industry builds countless millions of homes and offices worldwide every year. Part of the assembly process for those builds involves the lifting and placement of wall structures from a horizontal or flat position on the ground to a vertical position, whereupon the lifted wall structures are secured in position, and the build continued.

As is well known in the industry, there are many perils in building structures, one of which is the lifting of wall or panel structures into place. Numerous techniques are in use, usually employing a gang of men lifting and pushing the wall structure into place, and holding it in place for some time until it is secured. Many of these people get injured in the process due to a variety of mishaps, e.g., too few lifters for the job, slippage, and various other dangers. Further, many jobs are small jobs without a sufficient number of humans available to do the lifting. There may also be financial and other constraints present. Also, the industrial devices that are out there are ill-equipped for the safe and secure lifting of large wall structures.

There is, therefore, a present need to provide a reliable and efficient technique, method, system and apparatus for facilitating the hoisting of wall, panel and other like structures or other generally flat objects into a vertical placement.

There is also a present need for an efficient technique, method, system and apparatus for facilitating solo workers, as well as small numbers of workers, to perform the hoisting and moving of the wall, panel or other structures safely and securely during an assembly or building process.

The present invention is directed to various techniques, methods, systems, kits, devices and apparatuses for making the aforementioned various needs possible, permitting large wall sections, panels and other structures to be hoisted with one or few humans, and this operation being done in a safe and secure manner.

SUMMARY OF THE PRESENT INVENTION

The invention generally relates to a system, apparatus and associated technique for safely and securely lifting wall and other structures. As opposed to the prior art, the present invention includes an electronic winch device and configuration that when connected to an end of a wall structure, either alone or in combination with additional winch devices, lifts the structure. The present invention also includes keepers or catchments, such that when the electronic winch has hoisted the wall structure to a substantially vertical position, catches and keeps the wall structure in place, allowing the technician to more properly secure the wall structure in the vertical position. The apparatus of the present invention are also designed for portability and collapsibility, with structural members preferably telescoping inside one another to minimize size in transport, but securely configurable when extended and locked into place.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

FIG. 3A illustrates the apparatus of the present invention set up for hoisting but prior to said hoisting;

FIG. 3B illustrates the apparatus shown in FIG. 3A during the initial stage of the hoisting;

FIG. 3C illustrates the apparatus shown in FIGS. 3A and 3B during a later stage of the hoisting;

FIG. 3D illustrates the apparatus shown in FIGS. 3A-3C substantially at the end stage of the hoisting, with the wall member raised substantially vertically and substantially secured for bolstering;

FIG. 4A illustrates a number of the hoisting devices, such as shown in FIGS. 1A and 1B, disposed along a working face of the panel;

FIG. 4B is a side view of the hoisting system shown in FIG. 4A, illustrating the hoisting devices in operation lifting the panel;

FIG. 6A is a perspective view of an upper portion of the device or configuration, such as shown in FIG. 5A;

FIG. 6B is an end view of the upper portion of the exemplary device shown in FIG. 6A; and FIG. 6C is a side view of the upper portion of the exemplary device shown in FIG. 6A.

DETAILED DESCRIPTION OF THE PRESENT INVENTION

Figure 1A:
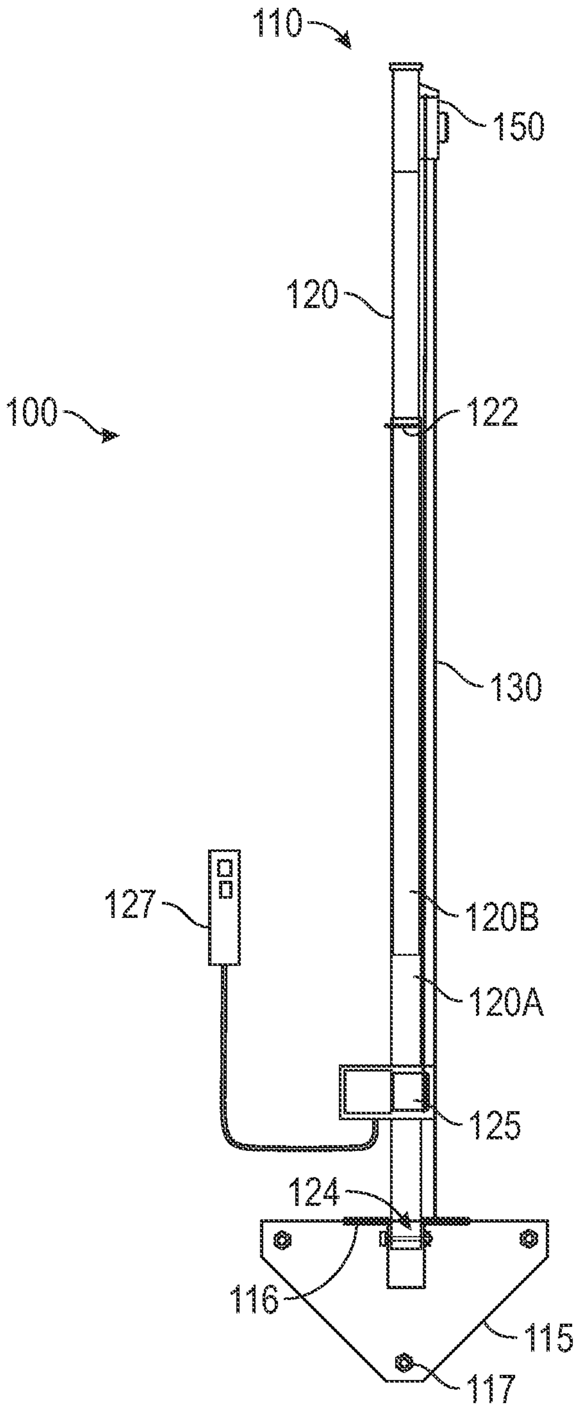
FIG. 1A is a representative rearview of an embodiment of a configuration incorporating the principles of the present invention with exemplary functionalities illustrated.

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

The present invention is generally directed to improved apparatuses, devices, systems, kits, processes and techniques for facilitating the lifting or hoisting of wall and other structures, such as in a construction area.

The design of a lift device pursuant to the present invention was conceived by Applicant when the availability of adequate lifts for wall panels was limited. The art known to Applicant in the industry "climbed" a 2×4 stud, but offered no protection when the hoisted panel went beyond the vertical position, creating considerable risk to the surrounding workers and the worker his self. Also the lift required a close-up, hands on action that was not safe.

The design of the lift apparatus, system and method of the instant invention, however, is intended to not only improve on the deficiencies of the prior art, but do a number of additional things.

First, for example, the improved system of the present invention is designed to allow multiple such device to operate simultaneously, as paired winches, by a single operator. In this fashion, the system keeps a large wall panel from twisting during the lift, which is a serious problem during builds.

Second, the improved design of the present invention, when the panel is so lifted, holds the wall panel in place until permanent bracing is installed.

Third, the improved apparatus of the present invention is preferably adjustable for various wall panel heights, making the lift safer.

Fourth, the present invention is also configurable such that when not in use, the components are easily disassembled for transportation.

Fifth, the various components of the present invention, such as after transported to a work site, are easily setup for operation, especially by a single person.

Sixth, the present invention provides the ability to set large walls in place by a single person instead of a large crew.

Finally, seventh, the devices employed in the present invention preferably use existing power sources on a job site for operation.

Although there are some lifting mechanisms available on the market, none meet all of the aforementioned desired criteria with no safe and practical alternative. With no adequate mechanisms or techniques available, Applicant began the process of designing a lift that was both functional, lightweight and served all the purposes for which it was needed to do. The known prior art lacks various features of the present invention, for example, the electric winch, whether used alone or in tandem with others. Also, the prior art lacks a keeper that keeps the raised panel in place and prohibits the wall panel from falling back onto the floor. Additionally, the prior art lacks the apparatus having telescoping components, such as a boom, therefore making the apparatus inconvenient for transportation. Finally, the known prior art, due to the inherent danger, requires that those devices be manually operated, which itself also makes these prior art devices very unsafe. Various other features and advantages of the present invention are described in more detail hereinbelow.

Figure 1B:
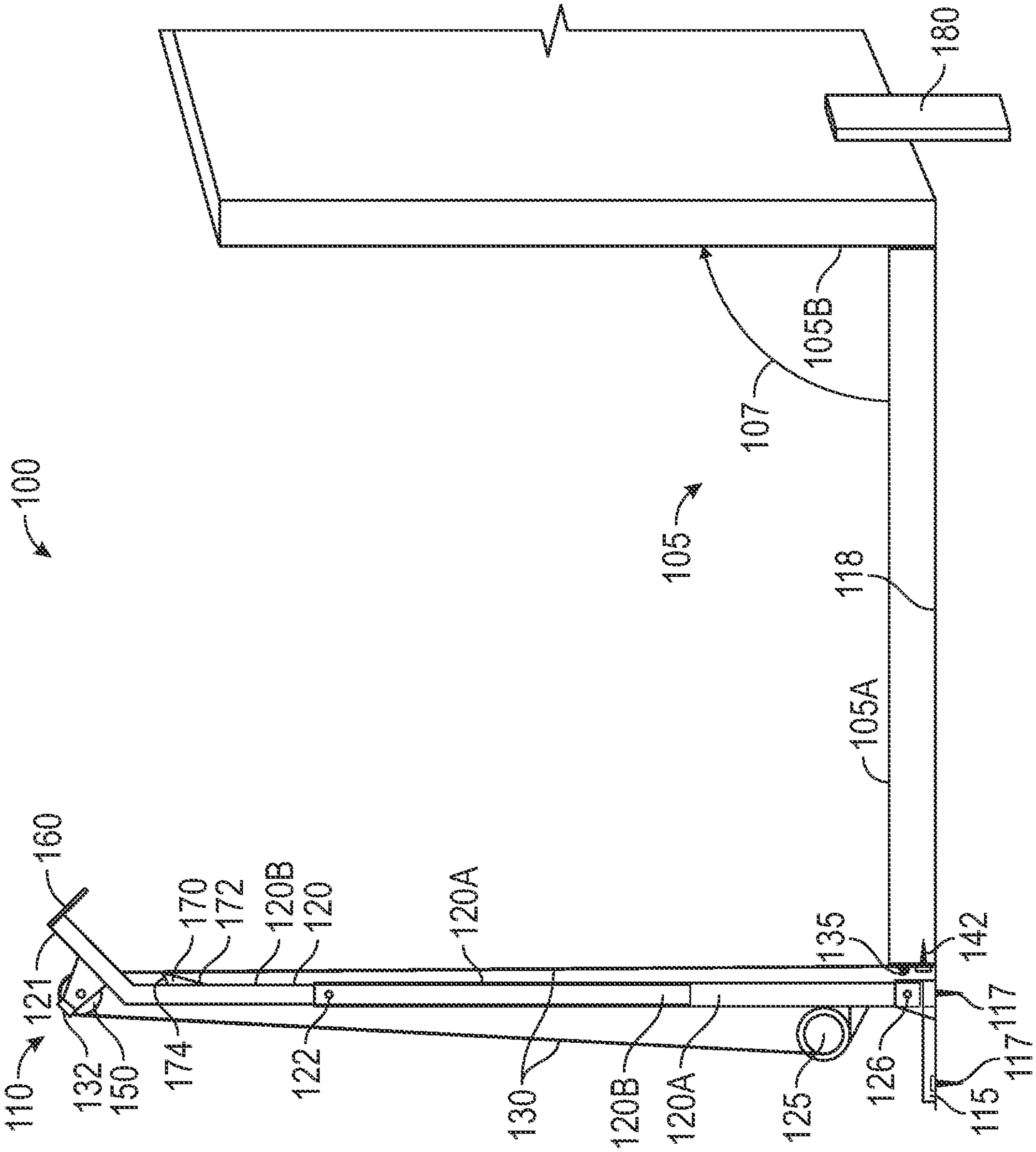
FIG. 1B is a side view of the representative embodiment shown in FIG. 1A, illustrating many of the elements of the present invention in the operation of hoisting a wall or other panel to a substantially vertical position.

With reference now to FIGS. 1A and 1B of the DRAWINGS, there is illustrated a representative configuration of a paradigm and configuration of a hoist system pursuant to the present invention, generally designated by the reference numeral 100. As mentioned, the present invention generally relates to the lifting, hoisting or raising of a wall, panel or other structure, generally designated by the reference numeral 105, from a substantially flat or horizontal position, generally designated by the reference numeral 105A, to a vertical or substantially vertical position, generally designated by the reference numeral 105B, the panel movement generally following an arc or trajectory of movement, generally designated by the reference numeral 107, as shown in FIG. 1B.

As shown in FIG. 1A, a hoist device or apparatus, generally designated by the reference numeral 110 is depicted in a back view, and in a side operational view in FIG. 1B. Corresponding components of the two illustrations will be referred to herein. At the bottom of the lift or hoist apparatus 110 is a base, generally designated by the reference numeral 115, shown in perspective on the left and flat and operational on the right, by which to anchor the hoist apparatus 110 in place for operation. It should be understood that the base 115 can be deployed vertically, as depicted in FIG. 1A, or horizontally, as depicted in FIG. 1B, depending upon the circumstances at the build. It should, of course, be understood that the safe operation of the hoisting device 110 or system 100 pursuant to the present invention requires a secure anchoring.

As shown in this exemplary embodiment, the base 115 is installed with fasteners, generally designated by the reference numeral 117, to the floor, generally designated by the reference numeral 118. Preferably, the base 115 is installed in front of the aforesaid wall panel 105A that is being lifted, e.g., within approximately ½" of the panel 105A. If the floor 118 is wood, then wood screws 117 are preferably employed to anchor the base 115, and if concrete then concrete screws 117, as is understood in the art. It should be understood that several bases 115 can be prepared for a corresponding number of discrete hoisting devices 110, anchoring each for a coordinated lift, as described in more detail hereinbelow.

It should also be understood that the base 115 is preferably configured such that an end thereof abuts the prone panel 105A, automatically situating, positioning or aligning the hoist device 110 relative to the panel 105, whereby the base 115 can be secured using the fasteners 117 through anchoring holes in the base 115, as shown. In this fashion, the base 115 can simply abut the panel 105A, and to best accomplish this the base 115 preferably includes an abutment member, generally designated by the reference numeral 116, to accomplish same.

With further reference to FIGS. 1A and 1B of the DRAWINGS, a boom portion, generally designated by the reference numeral 120 is secured to the base 115 and positioned adjacent to the aforementioned prone wall panel 105A. The boom portion 120 is also configured to have the various components of the hoisting device 100 positioned away from the wall panel 105A and the lifting arc 107. Further, as shown in FIG. 1B, the end of said boom portion 120 is curved, described in more detail hereinbelow.

This configuration 100 allows easy access to the components connected thereto, such as an electric winch, generally designated by the reference numeral 125, and a cable, generally designated by the reference numeral 130, which is secured at one end, e.g., in a spool adjacent said electric winch 125, and at the terminus of the other end of said cable 130 having a hook or other engagement member, generally designated by the reference numeral 135. It should be understood that the winch 125 is preferably powered via a conventional power source, such as electrical power sources at the job site, although alternative power sources may be employed, as is understood in the art, such as battery, solar, etc. For added safety, the winch 125 is preferably controlled using a controller, generally designated by the reference numeral 127, where a given controller 127 controls a given winch 125. It should also be understood that a given controller 127 may instead be configured to control a number of discrete winches 125 to perform a multi-device hoist or lift, described in more detail hereinbelow in connection with FIGS. 4A and 4B. The winch or winches 125 employed are preferably removable from the hoist system 100, allowing easier storage, service, and interchangeability.

In a preferred embodiment of the present invention, the boom portion 120 comprises telescoping members, such as a primary tube and a secondary tube, generally designated by the reference numerals 120A and 120B, respectively. For portability, the two members, such as telescoping members 120A and 120B, slide together, i.e., the secondary tube 120B within primary tube 120A, as is understood in the art. As discussed, an end of said boom portion 120 is curved, and in this embodiment that is telescoping member 120B, the curved portion generally designated by the reference numeral 121.

It should be understood that the curved portion 121 is a bend from the substantially vertical alignment of the other parts of the boom portion 120, and is bent or curved at an angle of about 45 degrees, although the angle may alternatively be between 30-60 degrees, 35-55 degrees, 40-50 degrees, or any degree or portions of a degree within these ranges. In a preferred embodiment of the present invention, the curved portion 121 is so bent or curved so that the hoisting device 110, when fully deployed, e.g., when the panel 105B is substantially vertical, that the curved portion 121, which is actually straight, becomes substantially horizontal, whereby the bottom of the curved portion 121 meets a flat edged portion of the raised panel 105, later designated as reference numeral 208 in connection with FIG. 2B, which cradles the panel 105B to aid in the securement, as discussed in more detail hereinbelow.

As discussed, for portability of the system 100, the two or more telescoping members of the boom portion 120, collapsing the overall size of the aforesaid configuration 100, the telescopic tubes allowing more compact storage, e.g., by removing the secondary member 120B from the primary member 120A, disengaging the winch 125, etc. It should also be understood that three or more such telescoping tubes or boom members, e.g., 4, 5 or 6, may be employed instead of the two shown in this representative embodiment. Further, it should be understood that in practicing the present invention the system 100 may include a number of discrete interchangeable boom portions 120 for a variety of jobs, e.g., a single tube member having a required strength for a specific wall panel 105 height, a number of telescoping tube members having varying compositions, heavy-duty tube members to perform a heavy lift versus lighter tube members for lighter lifts.

Turning back to the embodiment shown in FIGS. 1A and 1B, when configured for operation, the two telescoping members 120A and 120B can be offset in place and secured via adjustment pins, generally designated by the reference numeral 122, via the alignment of holes through each of the two members 120A and 120B, as is understood in the art, securing the members 120A and 120B in a given position for the lift, as described. In this embodiment, the positioning of the members 120A and 120B are such that, in addition to strength requirements, the curved portion 121 would extend over the top of an upright panel 105B. In this embodiment and in conjunction with the base 115, the primary tube 120A is anchored in place via a through pin, generally designated by the reference numeral 124, as illustrated in FIG. 1A. It should, of course, be understood that alternative ways to secure the hoist device 110 to the base are contemplated and within the scope of the instant invention.

Figure 2A:
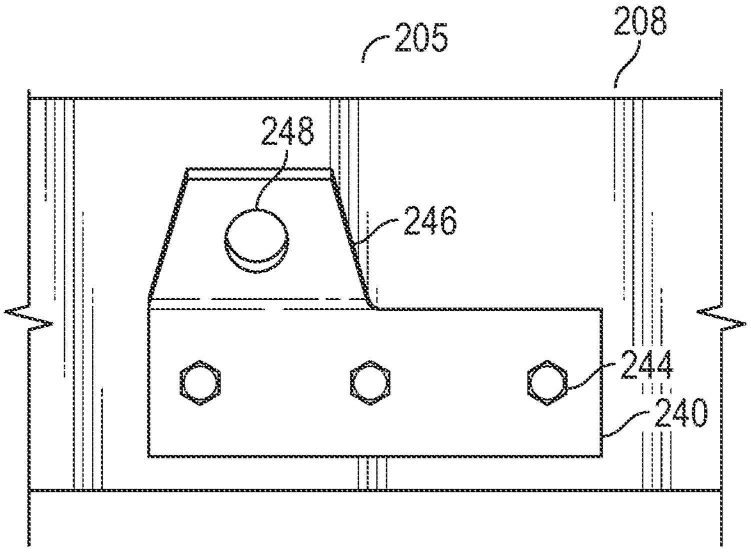
FIG. 2A is a side view illustration of a wall panel being lifted with a configuration of the present invention secured thereto, a plate panel, such as also shown in FIG. 1B.

With reference again to the horizontal or prone panel 105A in FIG. 1B, to facilitate the employment of the hoist apparatus 110, the aforesaid terminus of the cable 130, i.e., the hook 135, is connected to a panel plate, generally designated by the reference numeral 240, secured at an end of said panel 105A, as illustrated in FIG. 2A.

With reference now to FIG. 2A of the DRAWINGS, there is shown a view along the engaging surface of the panel 105, i.e., the edge portion or surface of panel 105A adjacent the hoisting device 100, generally designated by the reference numeral 208. The panel plate, generally designated herein by the reference numeral 240, is secured to the panel 105 along the surface of said edge portion 208 using a number of screws, generally designated by the reference numeral 242, shown in FIG. 2B (and as screws 142 in FIG. 1B), through corresponding engagement holes, generally designated by the reference numeral 244, thereby anchoring the panel plate 240 thereto. Also shown is an engagement portion, generally designated by the reference numeral 246, to receive said hook 135. It should be understood that the engagement portion 246 can include a hole, generally designated by the reference numeral 248, as illustrated, or other catchment for securely engaging the hook 135 therein, as is understood in the art.

Figure 2B:
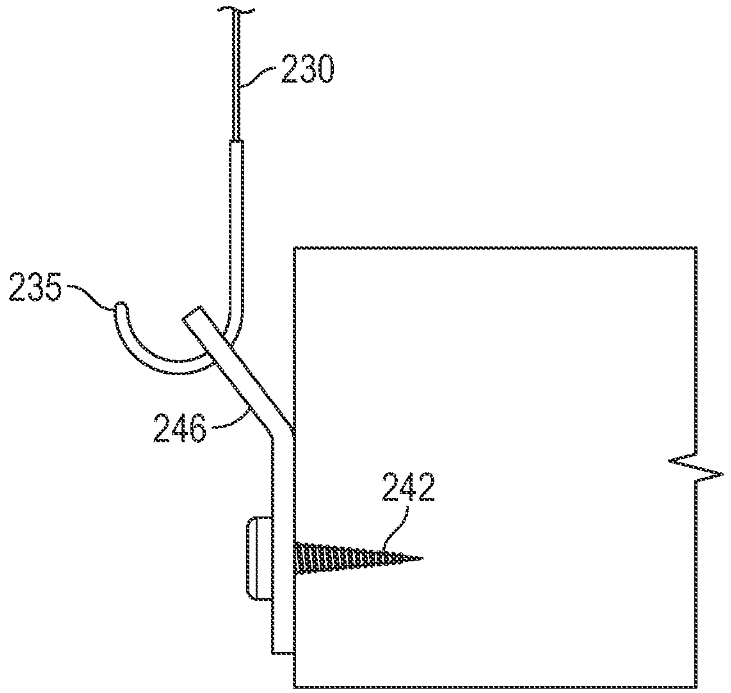
FIG. 2B is a side view of the representative plate panel embodiment shown in FIG. 2A, and also shown in FIG. 1B, where the cable and hook are engaged.

With reference now to FIG. 2B of the DRAWINGS, there is shown a representative operational engagement of said hook 135 to said engagement portion 246 and said hole 248 of said panel plate 240, as also illustrated and described in connection with FIG. 1B. In this embodiment, the engagement portion 246 of the panel plate 240 is at an angle from the plane of the working surface of the panel 105A, as illustrated, extending the hole 248 beyond the engaging surface 208 and allowing room for the hook 135/235 to pass therethrough for catchment, as is understood in the art. As shown, the cable 130/230 and the hook 135/235 are secured to the aforesaid hole 248 of the engagement portion 246, providing the requisite anchoring for the lifting end of the hoist apparatus 110. It should be understood that the size of the hook 135 and the engagement hole 248 are commensurate to provide a secure attachment, as is understood in the art. It should, of course, also be understood that the materials of the components constituting this catchment, e.g., the engaging portion 246, the hole 248 and the hook 135/235 are preferably made of strong materials to adequately perform the lifting without bending or other compromising.

As also shown in FIGS. 1A and 1B, when the telescopic tubes 120A and 120B are extended to an appropriate wall or panel 105 height setting, e.g., with the curved portion 121 properly positioned over the upright panel 105B, and when secured with the aforementioned height adjustment pin or pins 122, then the device 110 is ready to become operational. The worker spools the cable 130 and the hook 135 out around the hoist apparatus 110 from the electric winch 125, around a pulley, generally designated by the reference numeral 150, which is positioned on the curved portion 121 of the secondary tube 120B, and then back down to the aforedescribed panel plate 240 secured to the panel 105A, where the cable 130/230 is hooked, via hook 135/235, to the panel plate 240 via said plate hole 248.

Also shown is an external keeper, generally designated by the reference numeral 160, which is connected to an end portion of the curved portion 121, and descending downward to cradle and control an upright panel 105B from moving beyond vertical when raised, as described in more detail hereinbelow, thereby alleviating a significant hazard of the prior art devices. Further shown is an internal keeper, generally designated by the reference numeral 170, which is also affixed to the secondary tube or member 120B albeit below the curved portion 121, and acting to keep or control the panel 105 being raised as it approaches vertical. As shown, the keeper 170 has a general wedge shape, with a sloping portion 172, where the panel 105 slides across during hoisting, and a sharp edge portion 174, which after the panel 105 crosses the sloped portion 172, the panel 105 is unable to fall back do to the blockage by the end portion 174 of the keeper 170, thereby securing the panel 105 during the lifting process and providing a strong measure of safety. Indeed, the two keepers 160 and 170 of the present invention, along with the aforesaid abutment of the top of the upright panel 105B with the bottom of the curved portion 121, cradle the raising and raised panel 105 during the most critical phase in the operation.

At this point, instead of a group of workers congregating to lift the panel 105, a single user may initiate the hoist device or apparatus 110 in the system 100, e.g., by pressing a remote or otherwise activating the system by pressing the "up" button on the controller 127 to activate the electric winch or winches 125 to take up the slack in the cable 130, and the primary tube 120A and secondary tube 120B of the boom portion 120 are then brought to an upright position as the winch 125 increases the tension in the cable 130, which is configured as described hereinabove. Preferably, the initial lift phase hoists or lifts the panel 105A about a foot off the floor, whereby the integrity of the lift can be assessed before raising the wall panel 105 further.

With reference again to FIG. 1B, the boom 120 when in operation pivots about a pivot, generally designated by the reference numeral 126, which is preferably a constituent part of the base 115. In FIG. 1B, the boom 120 is shown at the beginning of the hoisting operation, i.e., with the cable 130 fully deployed and the boom 120 in an upright position.

In a preferred embodiment, the portions of the horizontal panel 105A facing the boom portion 120, during the lift off the floor, touch the boom portion 120 as the panel 105 rises, the engagement enough that the boom 120 is held in place against the top of the wall panel 105, as illustrated and discussed in more detail in FIGS. 3A-3D hereinbelow.

Figure 3A:
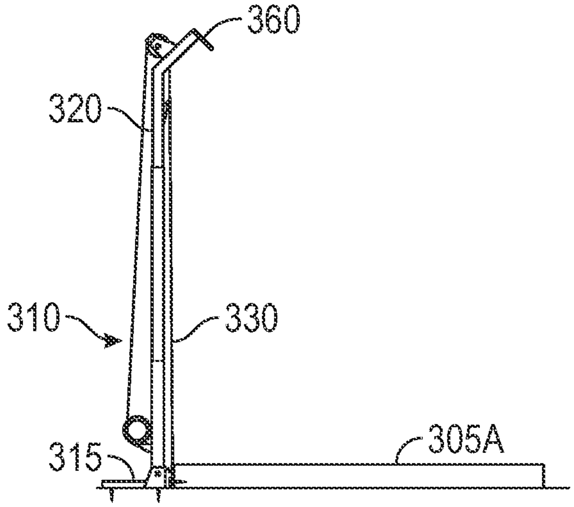
FIGS. 3A-3D are representative views of a configuration of the present invention, such as the apparatus shown in FIGS. 1A and 1B, in operation, with four progressive stages in the lifting or hoisting of a panel member pursuant to the teachings of the present invention.

With reference now to FIGS. 3A-3D of the DRAWINGS, there are shown a series of positions of the hoist system 100 of the present invention before, during and after the lift of a wall or other panel 305. In FIG. 3A of the DRAWINGS, which is equivalent to the position or configuration of the hoist apparatus 110 shown in FIGS. 1A and 1B, the boom 320 is substantially upright and the panel 305A is horizontal. As discussed, the electric winch 125 is enabled, the cable 130/330 tightened, and the panel 305A, secured to the cable 330 by the hook 135/235 attached to the panel plate 240, is raised from the horizontal position. It should be understood that lifting the panel 105/305 from the top, e.g., via the panel plate 240, minimizes the lateral forces against the panel bottom, thereby best preserving the integrity of the panel 105 in this operation.

Figure 3B:
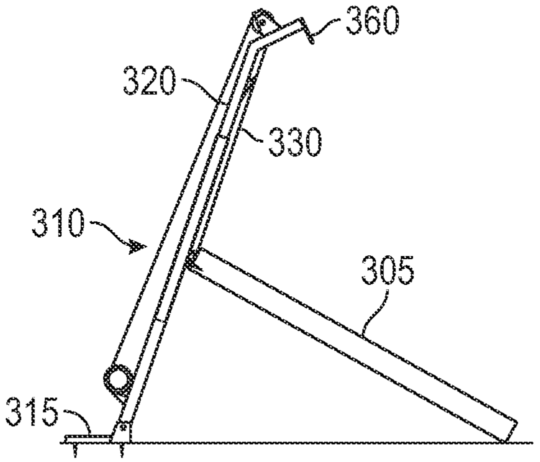

With reference now to FIG. 3B of the DRAWINGS, the panel 305 is partway raised, and, as illustrated, the boom portion 320 of the hoist apparatus 310 tilts, such that the end portion of plate 305, i.e., edge surface 208, pushes against the boom portion 320, a configuration maintained as the panel 305 is raised, as shown in the Figures hereinbelow.

Figure 3C:
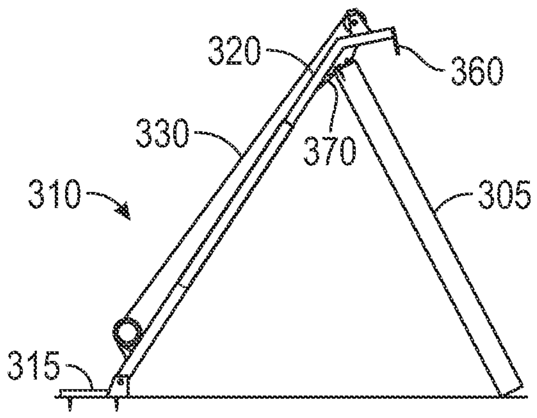

With reference now to FIG. 3C of the DRAWINGS, the panel 305 is shown mostly raised, and the boom portion 320 continues to tilt and cradle the top portion of the panel 305, as discussed. As also shown in FIG. 1B, along the top of the boom portion 120/320 is the aforementioned internal keeper 170/370 and the external keeper 160/360. It should be understood that the keepers 160/360 and 170/370 be strong enough to hold the panel 305 as it is raised and becomes vertical. As shown, as the boom portion 320 tilts and the panel 305 raises, the panel 305 enters the catchments of the keeper 370 and soon afterward substantially at verticality, the catchment of the keeper 360. For added safety, a cable keeper, generally illustrated in FIG. 1B and designated by the reference numeral 132, is deployed to control the cable 130, as described and shown in more detail in FIGS. 5 and 6 hereinbelow.

Figure 3D:
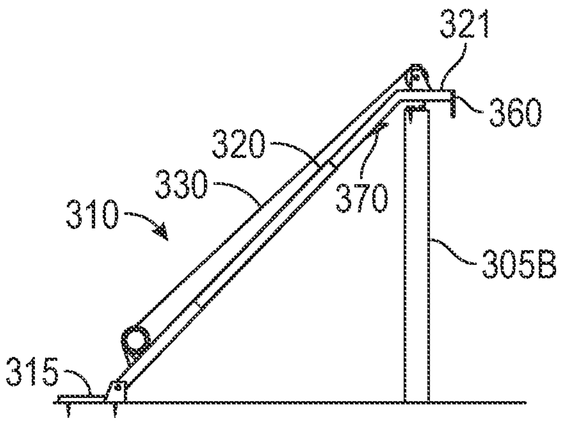

Finally, with reference now to FIG. 3D of the DRAWINGS, the panel 305 is substantially upright or vertical, i.e., raised into position, such as for a wall of a house or other construction. As illustrated, as the wall or panel 305 is lifted, the boom portion 320 has pivoted along the base 115/315, via said pivot 126, and is also slid along the wall panel 305 top until the wall panel is in the vertical position. It should be understood that the panel plate 140 may have a groove or slot therein for the cable 130 to so slide. At the last, i.e., in FIG. 3D, the fully-raised panel 305B enters the catchment of the keepers 160/360 and 170/370, and preferably falls into a bracing mode, e.g., supported by a block, generally designated by the reference numeral 180 in FIG. 1B. In other words, the ultimate placement of the panel 305B has been planned out and the positional aspects determined in advance. The cable 130/330 of the winch 125 at this point is no longer needed to hold the wall panel 305B in place and can be removed since the locks or keepers 160/360 and 170/370 provide the requisite temporary bracing needed. Also, the top of the boom 120, i.e., the keepers 160/360 and 170/370, are now acting as a temporary wall brace and can be left there as an added security along with more braces, such as the aforementioned block 180.

It should be understood that the raised panel 305B, temporarily held in place by the keepers 360 and 370, requires more secure anchorage to the overall structure. The instant invention, however, provides a user, even a single user, to hoist a heavy wall structure or panel into position.

Indeed, the system 100 of the present invention secures the so-raised panel 105/305 in a vertical or nearly vertical position for a sufficient time period for the worker to better anchor the heavy panel 105B/305B into place with blocks 180 or other means, as is well understood in the art.

With the wall panel 305B so anchored in place, the cable 330 and the hook 135/235 and the panel or wall plate 240 can be removed, and the winch/winches 125 can be spooled in, e.g., the cable 330 spooled onto a spool, by pressing an appropriate remote button on the controller 127. The winch 125 can then be removed from the boom 120/320 at this point for storage if needed.

It should be understood that the hoist system configurations shown in FIGS. 1 and 3 can be employed in pairs, triples or more to, simultaneously or in tandem, hoist a large panel 105/305. For example, a prone panel 105A/305A can be quite long, such that using only one hoist system 100 would produce too much torque on the panel 105A/305A during the lift.

Figure 4A:
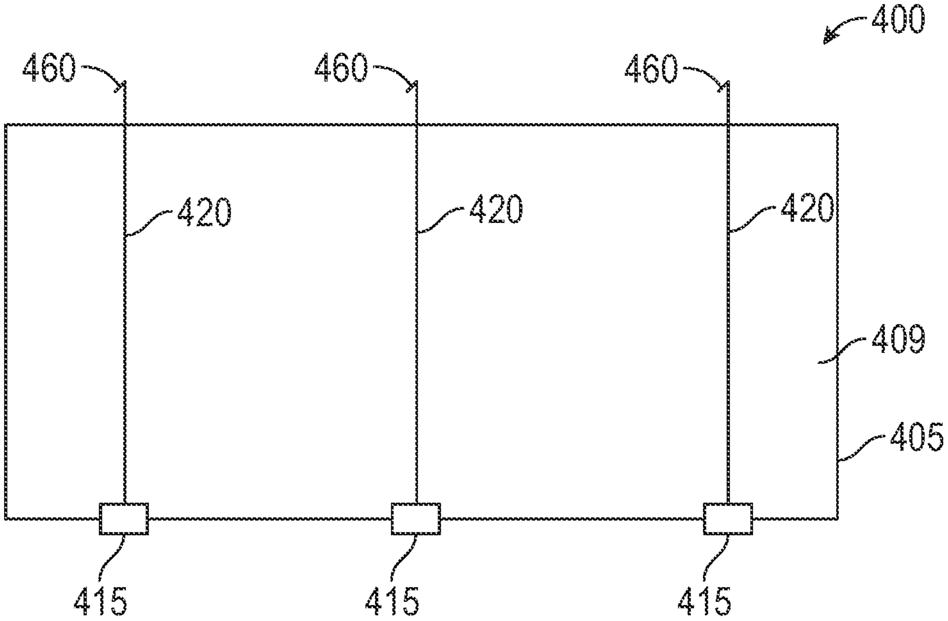
FIGS. 4A and 4B are representative views of a number of the devices shown in FIGS. 1, 2A-2B and 3A-3D in operation employing a hoisting system pursuant to principles of the present invention.
Figure 4B:
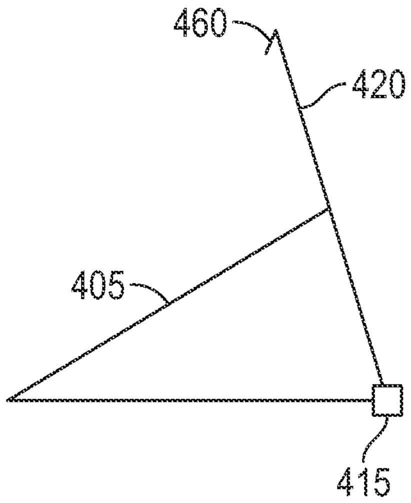

With reference now to FIGS. 4A and 4B of the DRAWINGS, there is shown an exemplary configuration, generally designated by the reference numeral 400, where a large panel 405 is being lifted by three hoist apparatuses 110/310, such as shown and described hereinabove, which are shown here in representation, with the base 115/415 of the hoist apparatuses 110/310 shown at the bottom, the booms 120/320/420 along the middle and the aforementioned keeper 160/360/460 at the top, all arranged along a surface or face of the panel 405, generally designated by the reference numeral 409, and FIG. 4B illustrates the configuration of FIG. 4A in a side view thereof. FIGS. 4A and 4B show the deployment at approximately the half way point. Although three hoist apparatuses 110/310 are depicted, it should be understood that fewer or more such devices may be required to keep the panel 405 from twisting or otherwise being harmed, as is understood in the art.

A user, such as a sole worker, can arrange the aforedescribed three hoist apparatuses 110/310, with the plates 240, cables 130/230/330, and other components configured as described, and deploy the electric winches 125 substantially simultaneously to raise the panel 405 to a substantially vertical position. The winches 125 for each of the hoist devices or apparatuses 110/310 can all raise at the same time or be deployed slowly to better event out the deployment and prevent twists or other deformations of the panel 405 during the ascent. For example, staggered or in tandem advancement of a few inches each may advance the panel upward safely. In the embodiment shown in FIGS. 4A and 4B, three controllers 127, one for each respective winch 125, may be utilized, with the worker operating the winches 125 from a safe distance. For example, by aligning the hoist apparatuses 110/310 appropriately, the worker can press the respective up commands on the controllers 127 to initiate the raising or hoisting and carefully observe and, if necessary, correct the hoisting operation remotely.

It should be understood that the controller 127 pursuant to the teachings of the present invention may govern a plurality of winches, such as for the three devices 110/310 and as shown in FIG. 4A. Furthermore, the controller 127 for the lifting may be initiated by hand, e.g., pressing a button on the controller 127, or by pressing down by foot, e.g., applying pressure to a controller 127. Also, the actions of the controller may be done either wirelessly or by wireline, as depicted in the exemplary embodiment in FIG. 1A. If wireline, then in FIG. 4A, three wirelines are conjoined to initiate a common lift command.

Figure 5:
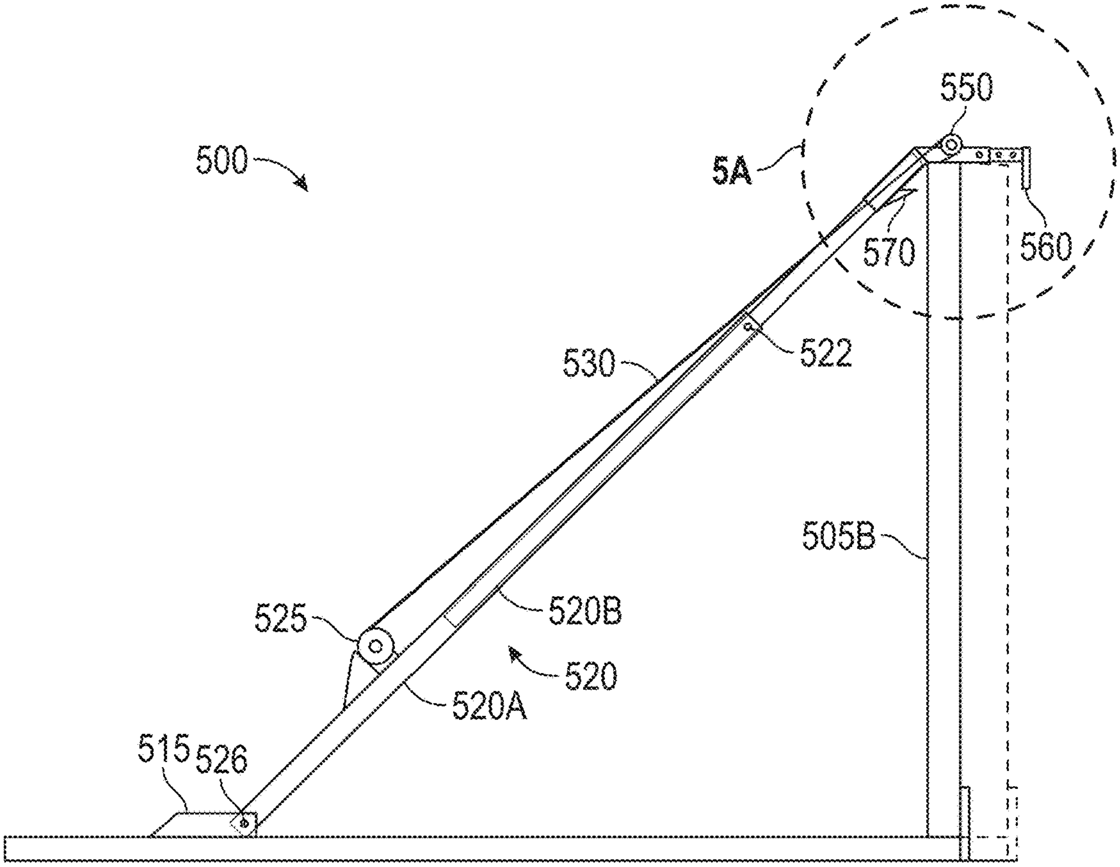
FIG. 5 is another representative embodiment of a device or configuration incorporating the principles of the present invention with exemplary functionalities illustrated.

With reference now to FIG. 5 of the DRAWINGS, there is shown a further exemplary configuration of a hoist system in operation, generally designated by the reference numeral 500, for lifting walls or panels 105/205/305/405 as described. As shown, the device 500 is fully extended and the panel 505B is substantially vertical and ready for installation, as described hereinabove, e.g., in connection with FIG. 3D.

As depicted, the device of the system 500 is anchored using base 515, and the boom portion 520 pivots about pivot 526, where telescoping primary 520A and secondary 520B tubes or members are positioned, and secured in that position by an adjuster pin 522, as described. A winch 525 governs a cable 530 that extends from said winch 525 (or an adjacent spool), across a pulley 550 to the top of the panel 505B, where it is attached via a hook 135 or other attachment means, as set forth and described in connection with FIGS. 1A, 1B, 2A and 2B hereinabove. Also, an external keeper 560 and an internal keeper 570 help control the panel 505 during the lifting operation and during the in site installation, as discussed hereinabove.

Figure 5A:
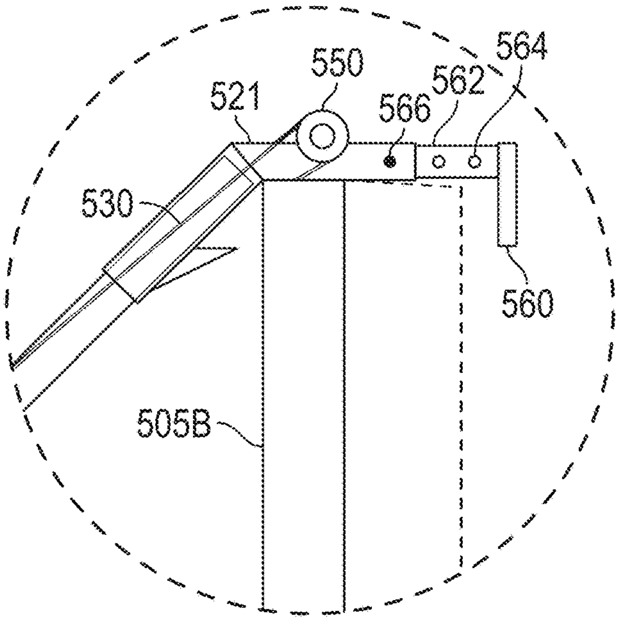
FIG. 5A illustrates a portion of the device or configuration of FIG. 5 showing the adjustability and extendibility of the device to accommodate various panel sizes.

With reference now to FIG. 5A of the DRAWINGS, this embodiment also depicts an adjustable keeper 560. Since the panel 105 may come in a variety of sizes, e.g., the thickness, the system 500 of the present invention has the capability to adjust to these conditions as well. In one embodiment of the present invention, an extension tube, generally designated by the reference numeral 562 telescopes into the curved end portion 321/521 of the secondary tube or member 520B, and the keeper 570 is affixed at the other end thereof, as illustrated. It should be understood that in a further embodiment, the extension tube 562 may be two or more telescoping tubes. Also, the internal keeper 560 is affixed along the telescoping secondary 520B tube, as described, below the bent portion 321/521, as also shown in FIG. 3D. Through employment of spaced extender holes, generally designated by the reference numeral 564, and an adjustment pin, generally designated by the reference numeral 566, the placement of the keeper 560 can be adapted for varying thicknesses of the panel 105.

Figure 6A:
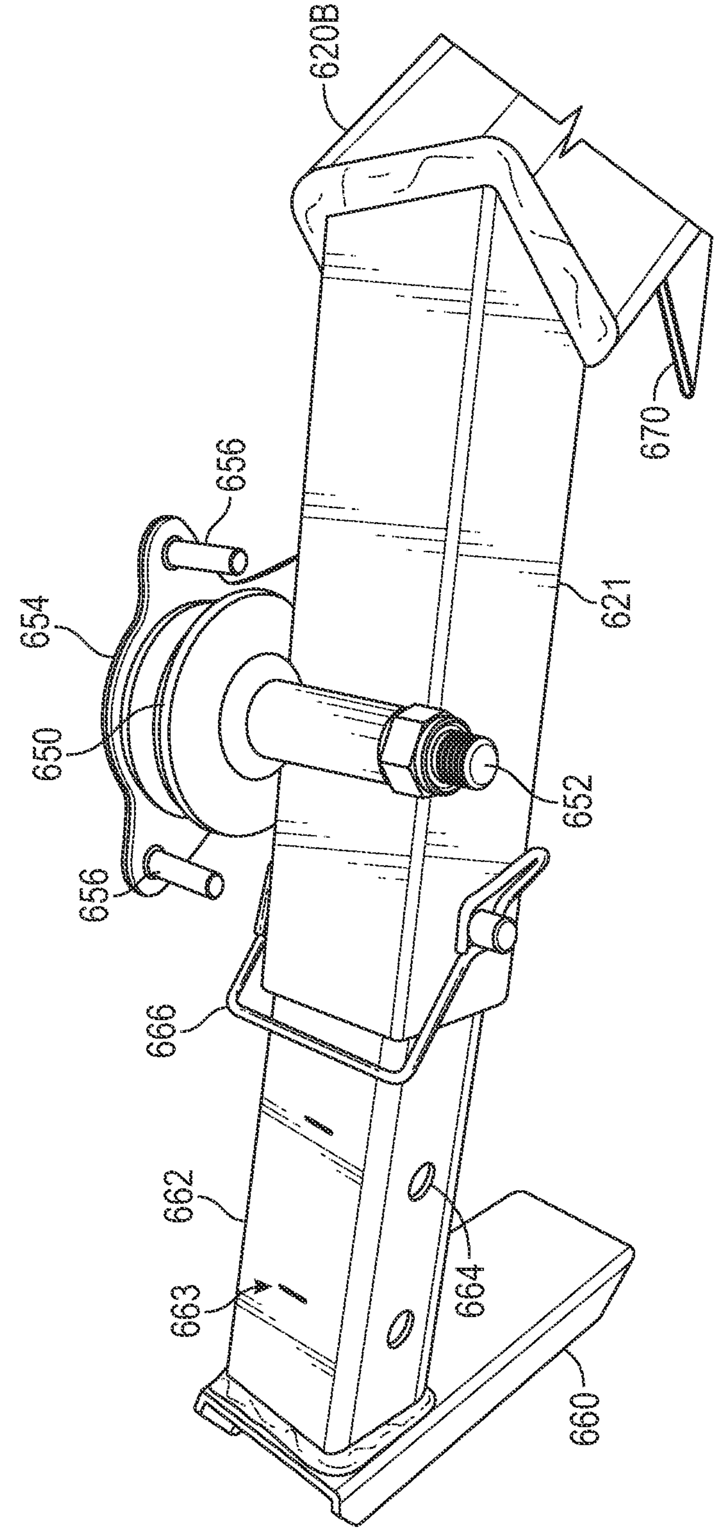
FIGS. 6A-6C are representative views of another embodiment of the portion shown in FIG. 5A of a device employing a hoisting system pursuant to principles of the present invention employing an extender.
Figure 6B:
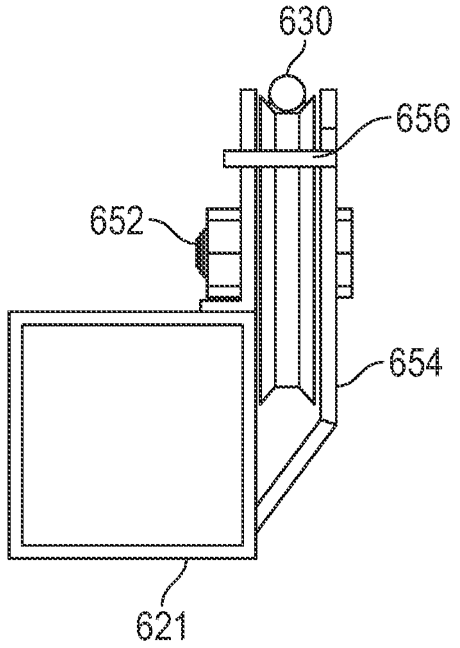
Figure 6C:
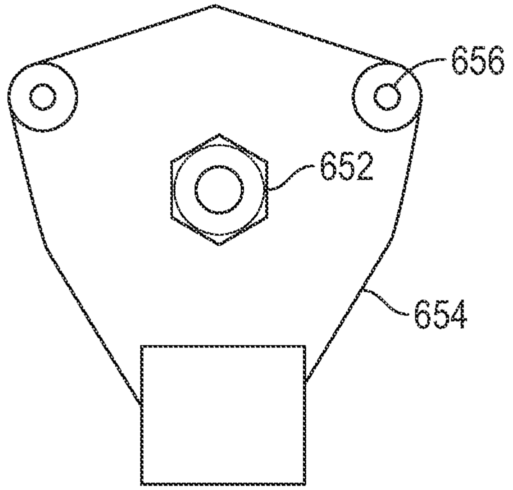

With reference now to FIGS. 6A-6C of the DRAWINGS, there is illustrated an embodiment of the device 110 and system 100 of the present invention, particularly a configuration of the components in the top portion thereof, including a preferred configuration of the curved portion 621 of a boom portion, as described hereinabove.

With reference now to FIG. 6A of the DRAWINGS, there is illustrated a perspective view of a top portion of an embodiment of the present invention. As discussed, the boom portion 120 preferably includes at least two telescoping members therein. The topmost of those members, i.e., the secondary member 120B, is depicted, and generally designated by the reference numeral 620B therein. Connected to said secondary member 620B, at an angle, is the curved portion 621, affixed to said secondary member 620B, e.g., by welding. Telescoping within said curved portion 621 is an extension member, generally designated by the reference numeral 662, with the external keeper 660 attached at the other end thereof, and the internal keeper 670 deployed also, as shown and as described. As described further hereinabove, a plurality of holes 664 allow the proper positioning of the extension member 662 to accommodate various panel 105 thicknesses and sizes, as discussed. A pin 666 secures the selected positioning of the extension member 662.

It should be understood that to facilitate the proper positioning of the extension member 662, the extension member 662 preferably includes indicia on the upper surface thereof to indicate the selected size, generally designated by the reference numeral 663, e.g., 8 inches, making the adjustment to the proper build specification easier.

With further reference to FIG. 6A, there is shown a configuration to secure the pulley 650 to the curved portion 621. As illustrated, the pulley 650 is mounted at one side of the curved portion 621 via a screw 652, the housing for which is welded to the upper surface of the curved portion 621 in this embodiment. At the other side of the pulley 650 is a plate, generally designated by the reference numeral 654 with two cable keepers 656 disposed on either side of the pulley 650, whereby when the cable 130 is placed along said pulley 650, the two cable keepers 656 prevent the cable 130 from sliding off the pulley 650 track, as is understood in the art.

It should be understood that each hoist system 100/300/400 is configured to handle a weight range, e.g., 100-200, 100-300, 200-500, 500-2,000 pounds and other ranges. For example, the cable 130 can be of varied diameter to best accomplish the desired load for the lifts. A one half inch steel cable wire, for example, can support over 4,000 pounds, and a one quarter inch steel cable wire can support over 1,000 pounds. The winches 125 are preferably able to employ a variety of gauge cables 130, as is understood in the art and, in a lit form, a variety of cable 130 sizes should be available. It should, therefore, be understood that the lift capacity of the hoist system 100/300/400, whether used alone or in tandem, can vary with the need and safety margin required.

In a currently preferred embodiment of the present invention, the hoist system 100 can lift panels 105 up to 25 foot long and up to about 440 pounds. Longer and heavy panels can, of course, be accommodated with multiple systems 100.

With reference now to FIG. 6B of the DRAWINGS, there is shown an end view of the configuration shown in FIG. 6A. As illustrated, the curved portion 621 has the aforementioned pulley 650, the securing screw 652, the plate 654, and one of the cable keepers or guards 656. As also shown, the cable 630 is shown in cross-section disposed on the pulley 650.

With reference now to FIG. 6C of the DRAWINGS, there is shown a side view of the configuration shown in FIG. 6B, with the screw or bolt 652, the two cable keepers 656, and the plate 654.

It should be understood that the extension member 562/662, although employed in a variety of contexts, in a preferred embodiment for lifting wall panels 505/605, the extender 562/662 is extended to best accommodate known wall thicknesses, e.g., 8, 9 and 10 inches. Also, if a raised panel 505/605 has a top plate or other fixture at the top portion 208, then the extender 562/662 is preferably extended to the furthest point, i.e., using the last hole 664, as is depicted in FIG. 6A.

As is readily apparent from the above descriptions of various embodiments of the present invention, the device 110 and system 100 make wall or panel 105 lifting easier, more accurate and safer. A builder may thus place the panel 105 for raising in a position relative to the installation of that wall into the structure. With the panel 105 so positioned, the panel plate 140/240 is secured to the edge surface 208 of the panel 105/205, e.g., as described using screws 242. The base 115/215 is then placed adjacent the panel plate 140/240, and properly positioned from the panel 105/205, such as though use of the aforementioned abutment member 116 shown in FIG. 1A. The base 115/215 is then secured with a plurality of fasteners 117, as described.

The boom portion 120 is then attached to the base 115 (or the boom portion 120 may be affixed prior to the securement of the base 115), and pivoted via said pivot 126 so that the builder may adjust the extender member 562/662 an appropriate amount to accommodate the particular panel 105 being lifted, and secured at an indicated position, as done with a pin 566/666. The winch 125 is then installed onto the boom portion 120, and secured thereto, as is understood in the art.

With the above components in place, the cable 130 is then deployed or spooled, e.g., from a spool adjacent the winch 125, and the cable 130 is extended over said pulley 150, preferably with the two cable keepers or guards 656 to secure the placement of the cable 130 on the pulley 150. The terminus of the cable 130, i.e., the hook 135, is then connected, secured, affixed or otherwise positioned to engage the engagement portion 246 on the panel 105, as discussed in more detail hereinabove.

The boom portion 120 is then tilted vertically, the winch 125 powered up, and the commands to the lift via the controller 172 are made. The lift may be in increments or continuous, as discussed.

Towards the end of the lift, the raising panel 105 engages the internal keeper 170, preventing the panel 105 from falling back. With more movement to vertical, the panel 105 abuts the external keeper 160, preventing the panel 105 from falling forward.

With the panel 105B so raised and temporarily, albeit securely, positioned via the keepers 160 and 170, the panel 105B is then further secured by the builder using blocks 180 and other means, as is understood in the art. The device 110 of the present invention can then be dismantled, the cable 130 released and spooled, the boom portion components disconnected, the panel plates 140/240 removed, and the system 100 and device 110 can then be redeployed elsewhere or further deployed at the same job site to raise other walls.

It should also be understood that the materials from the various plates, tubes and fasteners be made of strong metal, such as steel, to better withstand the forces at play. Preferred materials may also include hard plastics for lighter lifts.

Also, it should be understood that the hoist system 100/300/400 can be sold in a kit configuration, such as suitable for the variety of cable 130 sizes and loads handled, as described, or sold in component parts. Safety information would accompany each kit with instructions on the size and nature of permitted lifting using the components of the present invention.

It should be understood that additional functionalities than those set forth in FIGS. 1-6 are encompassed by the instant invention and within the scope of the present invention.

The previous descriptions are of preferred embodiments for implementing the invention, and the scope of the invention should not necessarily be limited by these descriptions. It should therefore be understood that alternative embodiments are within the contours of the present invention. The scope of the current invention is also defined by the following claims, but in this provisional, not limited thereto.

What is claimed is:

1. A hoist device for hoisting objects comprising:

a boom member, said boom member being securely fastened to a base at a first end thereof;

a pulley, said pulley being disposed at a second end of said boom member;

a winch, said winch secured to said boom member;

a cable, one end of which is secured to said winch, said cable configured at the other end to engage an object for hoisting, said cable being disposed on said pulley;

a keeper at said second end of said boom member, said keeper including a catchment, whereby said keeper is configured to secure said object raised by the hoist device from a substantially horizontal position to a substantially vertical position, said keeper configured to prevent said object from falling forward by said catchment, said object being connected to and raised by said winch by spooling said cable with an engagement member; and an internal keeper configured to prevent said object from falling backward, said internal keeper including a sloped portion and a wedge portion, whereby as said object in raising passes over said sloped portion, said wedge portion is capable of preventing said object from slipping back.

2. The hoist device according to claim 1, wherein said base is secured to a substrate.

3. The hoist device according to claim 1, wherein said base has an abutment member, said abutment member providing a spacing between said base and said object.

4. The hoist device according to claim 1, wherein said boom member comprises at least two telescoped members, a first of said at least two telescoped members being affixed to said base, an end of a second of said at least two telescoped members having a curved portion.

5. The hoist device according to claim 4, wherein said at least two telescoped members have a plurality of alignment holes therethrough, said at least two telescoped members being extended and a number of said alignment holes aligned.

6. The hoist device according to claim 5, further comprising:

at least one alignment pin, said at least one alignment pin being inserted through said alignment holes and locking said at least two telescoped members in one of a variety of height positions.

7. The hoist device according to claim 4, wherein at least one outer surface of said at least two telescoped members has indicia thereon, said indicia indicative of a variety of height positions for said telescoped members.

8. The hoist device according to claim 1, wherein said boom member has a pivot connection to said base, said boom member pivoting about a pivot.

9. The hoist device according to claim 1, wherein said second end of said boom member has a curved portion, and wherein said pulley is secured along a side of said curved portion.

10. The hoist device according to claim 1, wherein said pulley includes a guard plate and at least two cable keepers attached to said guard plate, said at least two cable keepers configured to prevent said cable from slipping off said pulley in operation.

11. The hoist device according to claim 1, wherein said winch is an electric (Original) winch.

12. The hoist device according to claim 1, wherein said internal keeper is secured to said boom member, whereby said internal keeper is capable of securing said object raised by the hoist device from a substantially horizontal position to a substantially vertical position from slipping back to said substantially horizontal position.

13. The hoist device according to claim 1, further comprising:

at least one extender, said at least one extender disposed between said keeper and said second end of said boom member, said second end of said boom member having a curved portion, said at least one extender being telescoped within said curved portion.

14. The hoist device according to claim 13, wherein said at least one extender is adjustable to a plurality of positions within said curved portion, whereby the position of the keeper is adjustable to accommodate said object.

15. The hoist device according to claim 13, further comprising:

at least one adjustment pin, wherein said at least one extender and said curved portion have adjustment holes therethrough, said at least one extender being extended to and said adjustment holes aligned, wherein said at least one adjustment pin being inserted through said alignment holes locks said at least one extender and said curved portion in one of a variety of spaced positions.

16. The hoist device according to claim 13, wherein at least one outer surface of said at least one extender and said curved portion has indicia thereon, said indicia indicative of a variety of spaced positions for said at least one extender and said curved portion.

17. The hoist device according to claim 1, further comprising:

at least one controller, said at least one controller allowing a user of said hoist device to activate or deactivate said winch.

18. The hoist device according to claim 1, wherein said cable at said other end comprises an engagement member configured to engage said object.

19. A hoisting system for hoisting objects comprising:

at least one hoist device, wherein each said at least one hoist device comprises:

a boom member, said boom member being securely fastened to a base at a first end thereof;

a pulley, said pulley being disposed at a second end of said boom member;

a winch, said winch secured to said boom member;

a cable, one end of which is secured to said winch, said cable configured at the other end to engage an object for hoisting, said cable being disposed on said pulley;

a keeper at said second end thereof said boom member, said keeper including a catchment, whereby said keeper is configured to secure said object raised by the hoist device from a substantially horizontal position to a substantially vertical position, said keeper configured to prevent said object from falling forward by said catchment, said object being connected to and raised by said winch by spooling said cable and an internal keeper configured to prevent said object from falling backward, said internal keeper including a sloped portion and a wedge portion, whereby as said object in raising passes over said sloped portion, said wedge portion is capable of preventing said object from slipping back, whereby said object is capable of being raised by said winch by spooling said cable attached to said object around said pulley.

20. The hoist system according to claim 19, wherein a plurality of said hoist devices are employed to lift said object.

21. The hoist system according to claim 19, wherein said cable at said other end comprises an engagement member configured to engage said object, wherein said object has at least one securement plate secured thereto, said engagement member of said cable being secured to said at least one securement plate.

22. A hoist system kit comprising:

at least one hoist device, wherein each said at least one hoist device comprises:

a base;

a boom member, said boom member capable of being securely fastened to said base at a first end thereof;

a keeper disposed at a second end of said boom member, said keeper including a catchment;

an internal keeper configured to prevent an object from falling backward, said internal keeper including a sloped portion and a wedge portion, whereby as said object in raising passes over said sloped portion, said wedge portion is capable of preventing said object from slipping back;

a pulley, said pulley being disposed at said second end of said boom member;

a winch, said winch capable of being secured to said boom member;

a cable, one end of which is capable of being secured to said winch, said cable configured to engage said object for hoisting, said cable capable of being disposed on said pulley; and whereby, upon assembly of a hoist system from said hoist system kit, said keeper is configured to secure said object raised by said at least one hoist device from a substantially horizontal position to a substantially vertical position, said keeper configured to prevent said object from falling forward by said catchment, said object being connected to and raised by said winch by spooling said cable, and whereby said object is capable of being raised by said winch by spooling said cable attached to said object around said pulley.

23. The hoist system kit according to claim 22, wherein said cable at said other end comprises an engagement member configured to engage said object, wherein said object has at least one securement plate secured thereto, said engagement member of said cable being secured to said at least one securement plate.

24. A method for hoisting an object comprising:

positioning said object for hoisting;

securing a securement plate on said object;

securing a base adjacent said object;

attaching a boom member to said base, said boom member configured to fasten to said base at a first end thereof, a keeper disposed at a second end of said boom member, said keeper having a catchment;

securing a winch on said boom member;

arranging a cable attached at one end to said winch, said cable at the other end thereof to engage said securement plate for hoisting said object, wrapping said cable about a pulley on said boom member, said pulley being disposed at said second end of said boom member; and operating said winch, thereby tightening said cable, and raising said object, whereby, upon raising said object from a substantially horizontal position to a substantially vertical position, said keeper is configured to secure said object at said substantially vertical position, said keeper configured to prevent said object from falling forward by said catchment, said object being connected to and raised by said winch by spooling said cable with an engagement member and whereby an internal keeper is configured to prevent said object from falling backward, said internal keeper including a sloped portion and a wedge portion, whereby as said object in raising passes over said sloped portion, said wedge portion is capable of preventing said object from slipping back.

25. The method according to claim 24, wherein said cable at said other end comprises an engagement member configured to engage said object, wherein said object has at least one said securement plate secured thereto, said engagement member of said cable being secured to said at least one securement plate.

* * * * *